US 9,316,146 B2

(12) United States Patent
Rienas et al.

(10) Patent No.: US 9,316,146 B2
(45) Date of Patent: Apr. 19, 2016

(54) SUPERCHARGER AIR FLOW DIVERTER (71) Applicant: EATON CORPORATION, Cleveland, OH (US)

(72) Inventors: Kenneth A. Rienas, Howell, MI (US); Jon P. Trudeau, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/163,951

(22) Filed: Jan. 24, 2014

(65) Prior Publication Data
US 2014/0209071 A1 Jul. 31, 2014

Related U.S. Application Data (60) Provisional application No. 61/757,928, filed on Jan. 29, 2013.

(51) Int. Cl.
F02B 33/00 (2006.01)
F02B 33/44 (2006.01)
F02B 39/00 (2006.01)
F02B 39/04 (2006.01)
F02B 37/12 (2006.01)

(52) U.S. Cl.
CPC ............ *F02B 33/44* (2013.01); *F02B 37/127* (2013.01); *F02B 39/04* (2013.01); *Y02T 10/144* (2013.01)

(58) Field of Classification Search
CPC ........ F02B 33/44; F02B 37/127; F02B 39/04; Y02T 10/144; F02D 41/0007; F02M 25/0709
USPC ........................................ 60/611, 602, 605.2
See application file for complete search history.

(56) References Cited

U.S. PATENT DOCUMENTS

| 4,619,590 A | 10/1986 | Johnson |
| 4,817,387 A * | 4/1989 | Lashbrook ...................... 60/611 |
| 2010/0065025 A1 * | 3/2010 | Bucknell .................... 123/559.1 |
| 2011/0232280 A1 | 9/2011 | Zuccone |
| 2013/0152582 A1 * | 6/2013 | Anschel et al. .............. 60/605.2 |

FOREIGN PATENT DOCUMENTS

JP 2001-221044 8/2001

OTHER PUBLICATIONS

International Search Report and Written Opinion for PCT/US2014/013490 mailed May 26, 2014.

* cited by examiner

*Primary Examiner* — Jorge Pereiro
*Assistant Examiner* — Dapinder Singh
(74) *Attorney, Agent, or Firm* — Merchant & Gould P.C.

(57) ABSTRACT

A supercharger system includes a supercharger main housing enclosing one or more active components for moving air from an upstream side to a downstream side of the supercharger main housing. The system includes a supercharger inlet housing mounted at the upstream side of the supercharger main housing and a re-circulation line. The re-circulation line provides fluid communication between the downstream side of the supercharger main housing and the supercharger inlet housing. The line includes a flow diverter having first and second portions within the supercharger inlet housing. The first portion defines a first re-circulation flow direction and the second portion defines a second re-circulation flow direction. The second direction may be 45-135 degrees relative to the first recirculation direction.

32 Claims, 8 Drawing Sheets

SUPERCHARGER AIR FLOW DIVERTER

CROSS-REFERENCE TO RELATED APPLICATIONS

This application claims priority to and the benefit of U.S. Provisional Patent Application No. 61/757,928, filed Jan. 29, 2013, entitled "SUPERCHARGER AIRFLOW DIVERTER," the disclosure of which is hereby incorporated by reference herein in its entirety.

INTRODUCTION

Modern supercharger designs typically incorporate an airflow bypass in order to increase the engine's operating efficiency when the supercharger is not called upon to generate boost. Such a bypass typically uses a butterfly valve similar to those used in the throttle body of the engine, which is closed by default. When additional power is called upon from the supercharger, engine vacuum decreases and in response the bypass valve closes. As a result, intake air then passes through the supercharger to increase pressure in the intake in excess of atmospheric pressure to permit the engine to generate additional power. When engine vacuum is high, such as when the engine is at idle or at light throttle or in cruise mode, an actuator opens the bypass valve thereby allowing pressurized outlet air to circulate through the bypass valve back to the supercharger inlet. The bypass valve is intended to equalize pressure between the supercharger's inlet and outlet thereby decreasing the required input power to rotate the supercharger during the previously mentioned low engine load conditions. However, when the pressurized outlet air recirculates to the supercharger inlet, it creates turbulences and vortices as it contacts incoming naturally-aspirated airflow. This contact increases noise and decreases the efficiency of the supercharger. Auto manufacturers and consumers often find this noise undesirable, which can reduce the marketability of supercharged vehicles, notwithstanding their attendant benefits. On certain vehicles, this so-called noise, vibration, or harshness generated by superchargers can be 80 to 90 dBA or higher depending on engine speed and loading condition.

SUMMARY

In one aspect, the technology relates to a supercharger system having: a supercharger main housing enclosing one or more active components for moving air from an upstream side to a downstream side of the supercharger main housing; a supercharger inlet housing mounted at the upstream side of the supercharger main housing; and a re-circulation line that provides fluid communication between the downstream side of the supercharger main housing and the supercharger inlet housing, the re-circulation line including a flow diverter having first and second portions within the supercharger inlet housing, the first portion defining a first re-circulation flow direction and the second portion defining a second re-circulation flow direction, the second re-circulation direction being angled 45-135 degrees relative to the first recirculation direction, and the second portion being located at an outlet end of the re-circulation line.

In another aspect, the technology relates to a supercharger system having: a supercharger having an inlet and an outlet; and a re-circulation line that provides fluid communication between outlet and the inlet, the re-circulation line including a flow diverter having first and second portions within the inlet, the first portion defining a first re-circulation flow direction and the second portion defining a second re-circulation flow direction, the second re-circulation direction being angled 45-135 degrees relative to the first recirculation direction, and the second portion being located at an outlet end of the re-circulation line.

In another aspect, the technology relates to a supercharger system having: a supercharger having an inlet and an outlet; and a re-circulation line that provides fluid communication between outlet and the inlet, the re-circulation line including a terminal end portion that extends within the inlet, the terminal end portion being configured to direct re-circulation flow into the inlet of the supercharger along a first direction that is angled no more than 45 degrees relative to a main flow direction through the inlet of the supercharger.

BRIEF DESCRIPTION OF THE DRAWINGS

Various aspects of the present teachings are shown in the drawings, however, the disclosure is not limited to the precise arrangements and instrumentalities shown.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
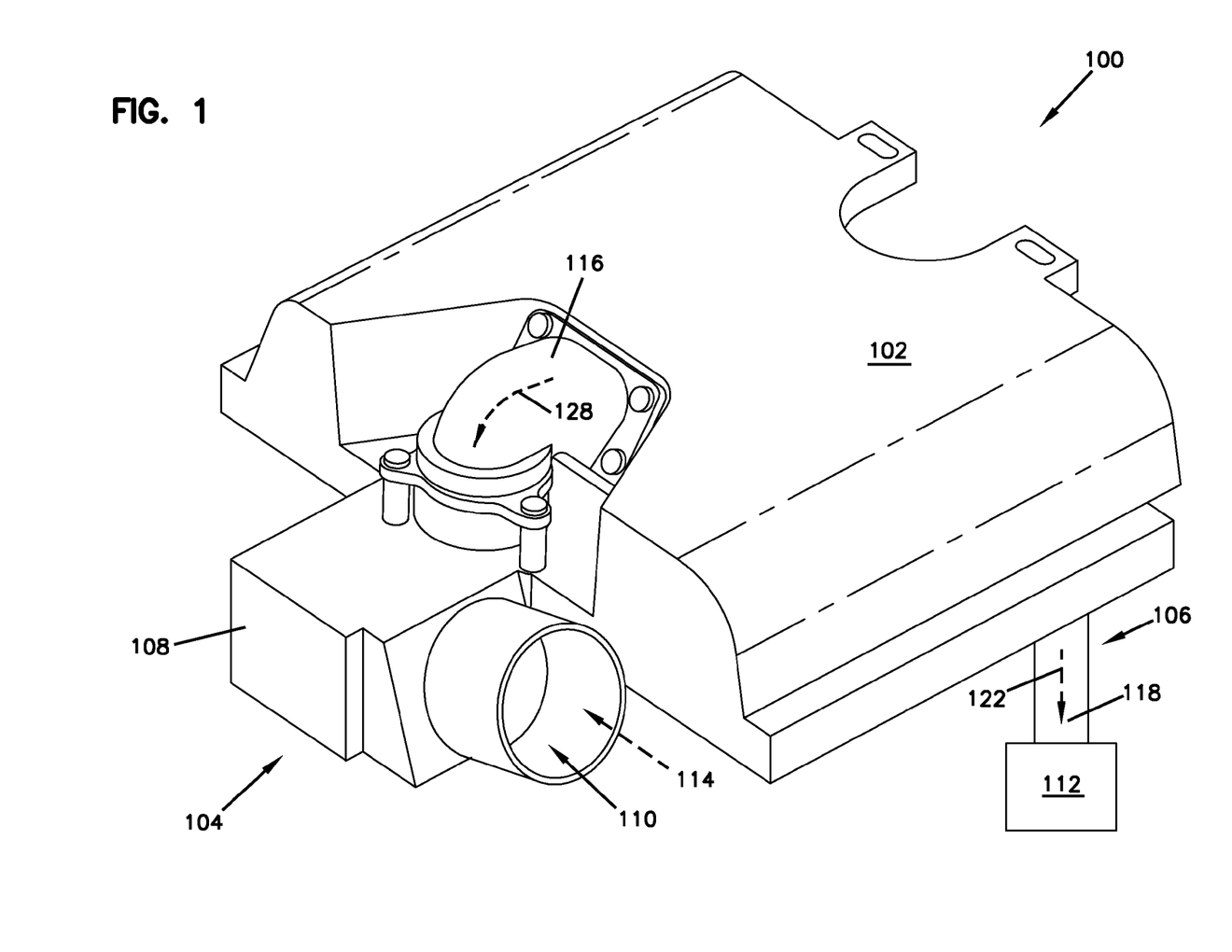
FIG. 1 depicts a perspective view of a supercharger system in accordance with the many aspects of the present teachings.
Figure 2:
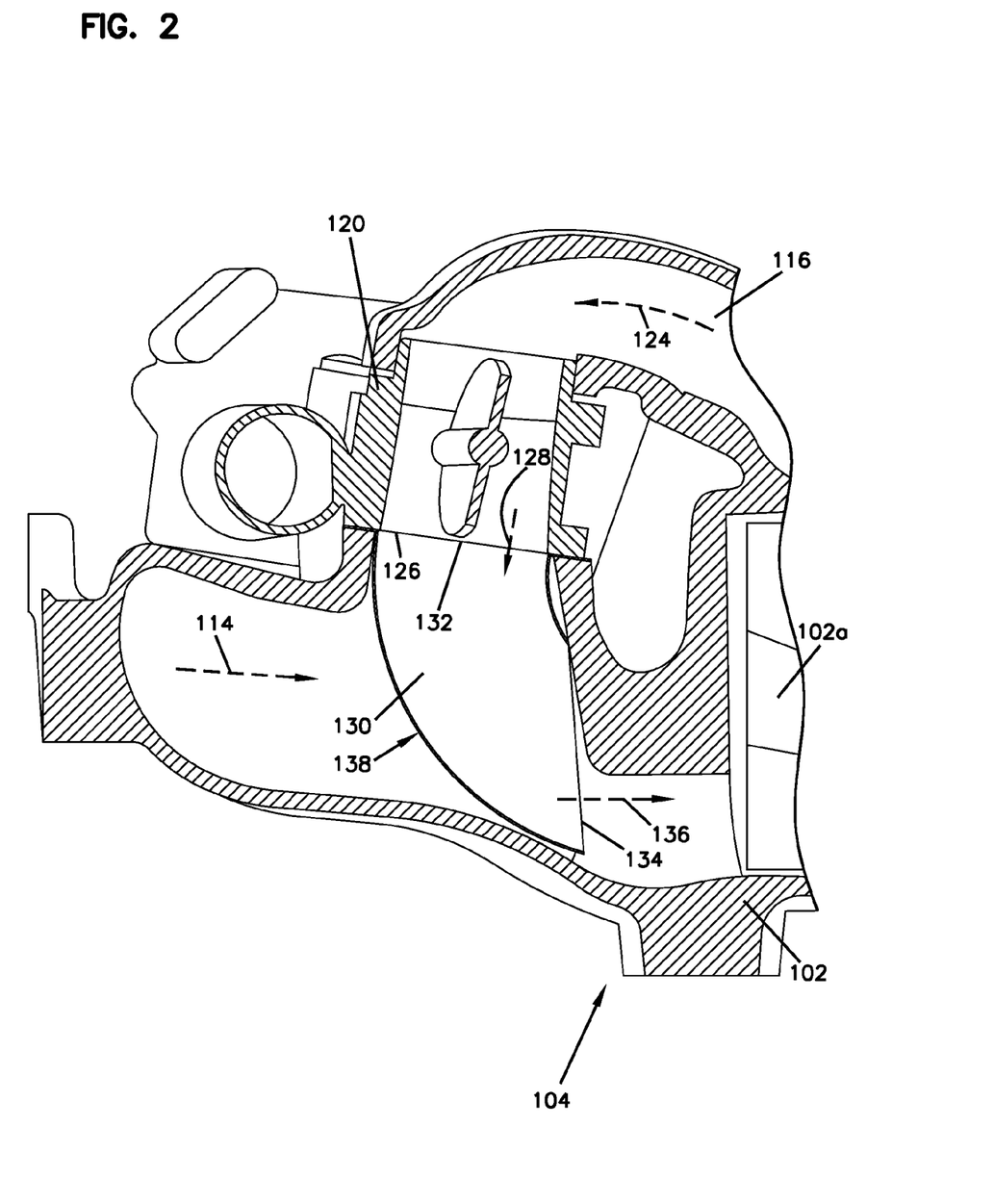
FIG. 2 depicts a side sectional view of an upstream side of the supercharger system of FIG. 1 in accordance with the many aspects of the present teachings.
Figure 3:
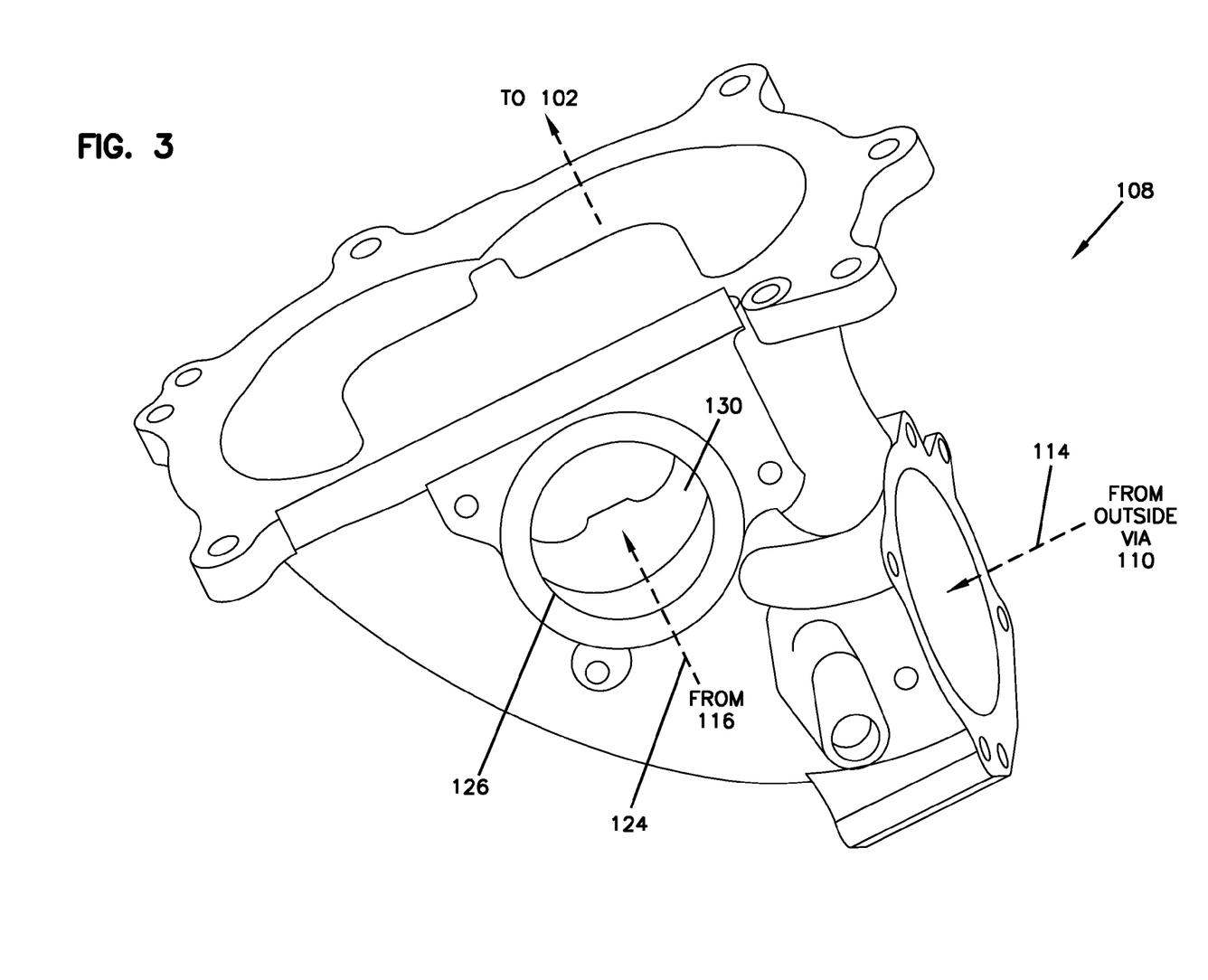
FIG. 3 depicts a perspective view of an inlet housing in accordance with the many aspects of the present teachings.

FIGS. 1-3 depict various views of a supercharger system 100 in accordance with the many aspects of the present teachings. The system 100 includes a supercharger main housing 102 having an upstream side 104 and a downstream side 106. Various types of superchargers are known and the operation and advantages thereof are readily apparent to a person of skill in the art. In the system 100 described herein, virtually any type of supercharger, including roots, centrifugal, twin-screw, sliding vane, and scroll, may be utilized. An inlet housing 108 is located at the upstream side 104 of the supercharger main housing 102. Briefly, air is drawn from the outside (e.g., via the vehicle's air filtration system) via a main inlet channel 110 and passes through the inlet housing 108. From the inlet housing 108, air is drawn into the supercharger main housing 102 and discharged from the downstream side 106 through an outlet conduit 18 to an engine 112. The boost in air pressure and/or airflow provided by the supercharger system 100 boosts intake pressure at the engine inlet to improve engine power and performance.

The inlet housing 108 is typically a cast component that directs a naturally-aspirated airflow 114 from the main inlet channel 110 into the supercharger main housing 102. The interior of the inlet housing 108 is formed of generally rounded sides, corners, and transitions to smooth the main flow direction of the naturally-aspirated airflow 114. The inlet housing 108 defines a shape consistent with that of the supercharger main housing 102, which helps provide a more even airflow into the supercharger main housing 102, which contains a pair of rotors 102a.

The inlet housing 104 is fluidically connected to a bypass or recirculation line 116 that fluidically connects the downstream side 106 of the supercharger main housing 102 to the inlet housing 104. A bypass or recirculation valve 120 is located proximate the inlet housing 104 and opens and closes as required during operation of the supercharger system 100. When the recirculation valve 120 is in the open position, a portion of a downstream airflow 122 is allowed to reenter the recirculation as so-called bypass or recirculation air 124. This bypass or recirculation air 124 will flow as long as the recirculation valve 120 is open and the active components (e.g., screws or rotors) located within the supercharger main housing 102 are turning. Of course, clutched superchargers that can disengage such active components may also be used in the depicted system 100. In such a case, disengagement of the rotors will prevent rotation thereof, thus allowing air to pass from the inlet housing 104, through the recirculation valve 120, to the outlet conduit 118, and on to the engine 112. In certain embodiments, a valve structure located between the inlet housing 104 and the main housing 102 may close, thus preventing any naturally-aspirated air 114 from entering the main housing 102. When the recirculation valve 120 is open, very little, if any, pressure builds within the supercharger main housing 102, thus engine power will not be increased.

When additional engine power is required (e.g., during acceleration), the recirculation valve 120 closes, and pressure builds on the downstream side 106 of the supercharger main housing 102, before the engine 112 inlet. Both electric and vacuum operated bypass valves are compatible with the technology disclosed herein. Electric valves typically respond faster than vacuum-operated valves. Additionally, the valve angle on an electric-operated valve can be controlled to modulate pressure (i.e., boost) to the desired level. Vacuum-operated valves are primarily full-open/full-closed with limited capability to modulate the boost level.

Returning to the condition when the recirculation valve 120 is open and the active components in the supercharger main housing 102 are operating, bypass or recirculation air 124 is passed through the recirculation valve 120 and into an opening 126 defined by the inlet housing 104. Thus, the recirculation air 124 flows into the inlet housing 104 at a first re-circulation flow direction 128. To reduce noise typically attendant with the interference between the recirculation air 124 and the naturally-aspirated air 114, the inlet housing 104 includes a diverter 130 extending into the inlet housing 104. The diverter 130 has a first portion 132 and a second portion 134. The first portion 132 defines the first re-circulation flow direction 128. The second portion 134 defines a second re-circulation flow direction 136, and is the terminal end of the recirculation line 116.

Figure 4:
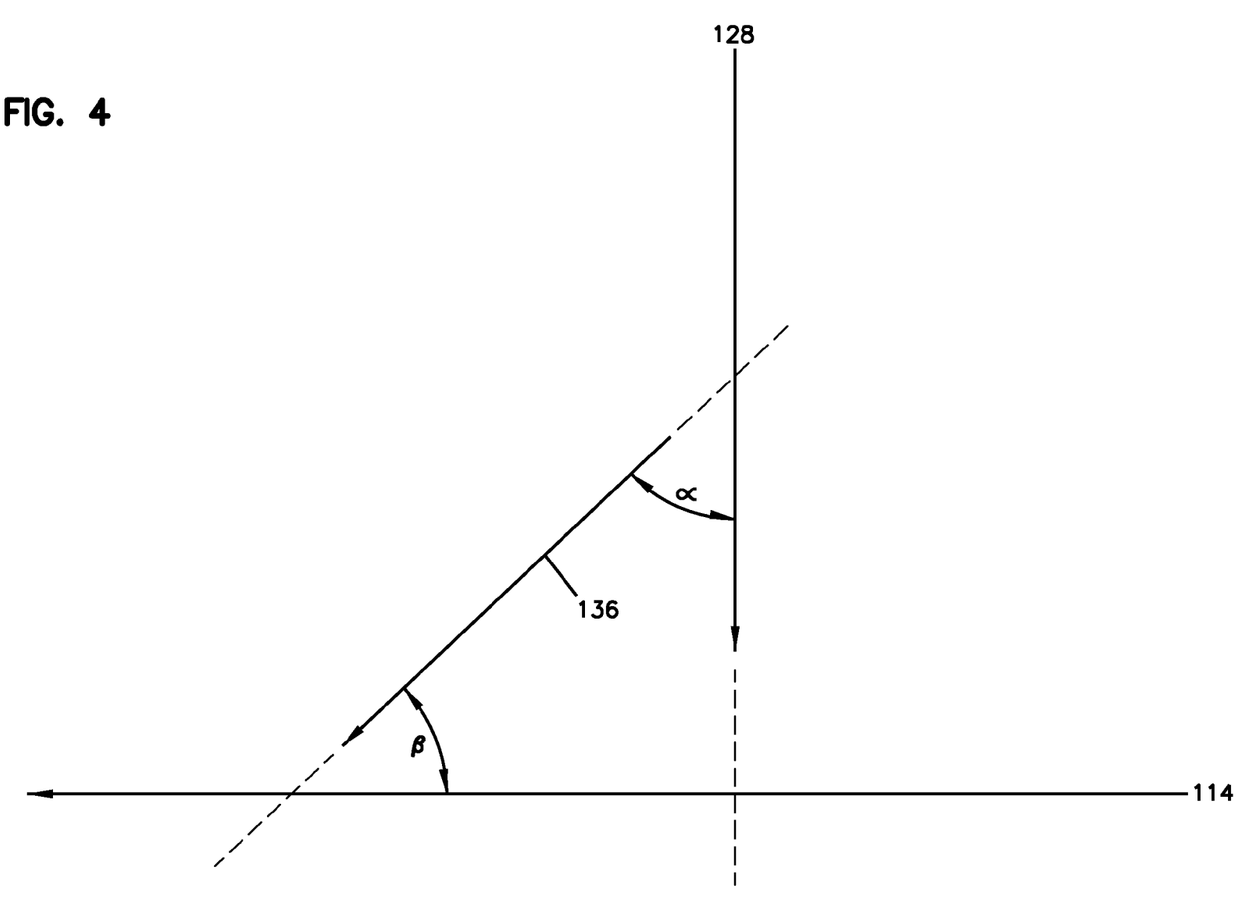
FIG. 4 depicts relationships between airflows within an inlet housing in accordance with the many aspects of the present teachings.

FIG. 4 depicts the relationships between the first re-circulation flow direction 128, the main flow direction of the naturally-aspirated air 114, and various second re-circulation flow directions 136. In FIG. 4, the angle of the second re-circulation flow direction 136 relative to the first recirculation flow direction 128 is depicted as a redirected angle α. In certain embodiments, the second re-circulation flow direction 136 may be angled 45 degrees to 135 degrees relative to the first recirculation flow direction 128. In other embodiments, the second re-circulation flow direction 136 may be angled 60 degrees to 120 degrees relative to the first recirculation flow direction 128. In other embodiments, the second re-circulation flow direction 136 may be angled 75 degrees to 105 degrees relative to the first recirculation flow direction 128. In other embodiments, the second re-circulation flow direction 136 may be angled 90 degrees relative to the first recirculation flow direction 128. Regardless of the relative angle, the second portion 134 directs the re-circulated air 124 towards the upstream side of the main housing 102.

The second re-circulation flow direction 136 may also be defined relative to the main flow direction of the naturally-aspirated air 114 through the inlet housing 104, depicted in FIG. 4 as an introduction angle β. In certain embodiments, second re-circulation flow direction 136 is angled at no more than 45 degrees relative to the main flow direction through the inlet housing 104. Other embodiments configure the second re-circulation flow direction 136 at an angle of not more than 30 degrees, or not more than 15 degrees, or not more than 0 degrees relative to the main flow direction through the inlet housing 104.

This second re-circulation flow direction 136 reduces vortices would otherwise form when the recirculation valve 120 is open. In certain embodiments, a rear surface 138 of the diverter 130 splits the naturally-aspirated airflow 114 around the redirected recirculation airflow 124, so as allow the naturally-aspirated airflow 114 to more easily encapsulate the redirected recirculation airflow 124. It can be shown that use of a diverter such as the type described herein can reduce noise, vibration, and harshness by at least 5%, at least 7%, or at least 10% (e.g., dBA level at certain engine speeds and loading conditions) from the values measured in an identical supercharger system lacking such a diverter.

Figure 5A:
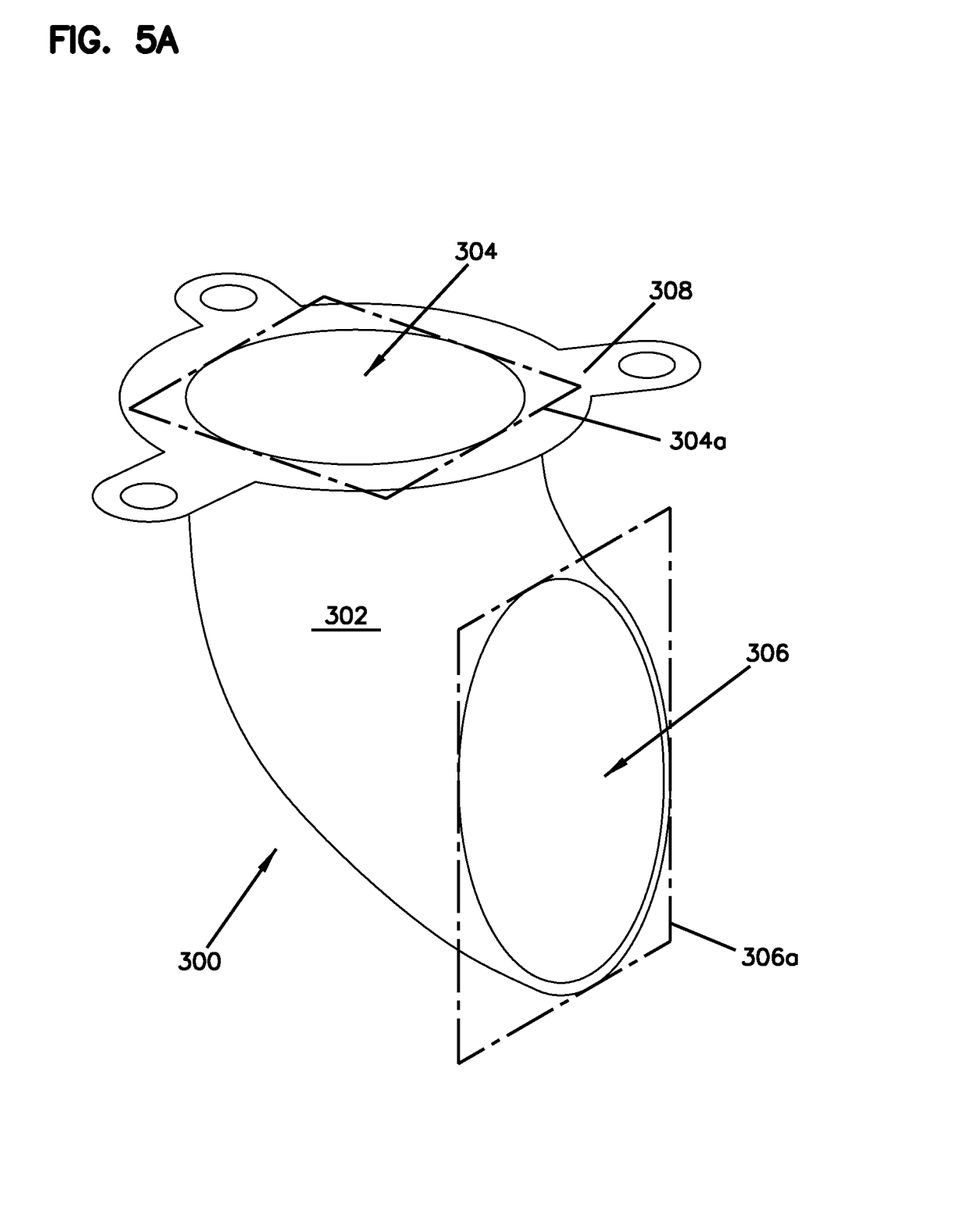
FIGS. 5A and 5B depict perspective and side views, respectively, of a bypass airflow diverter in accordance with the many aspects of the present teachings.
Figure 5B:
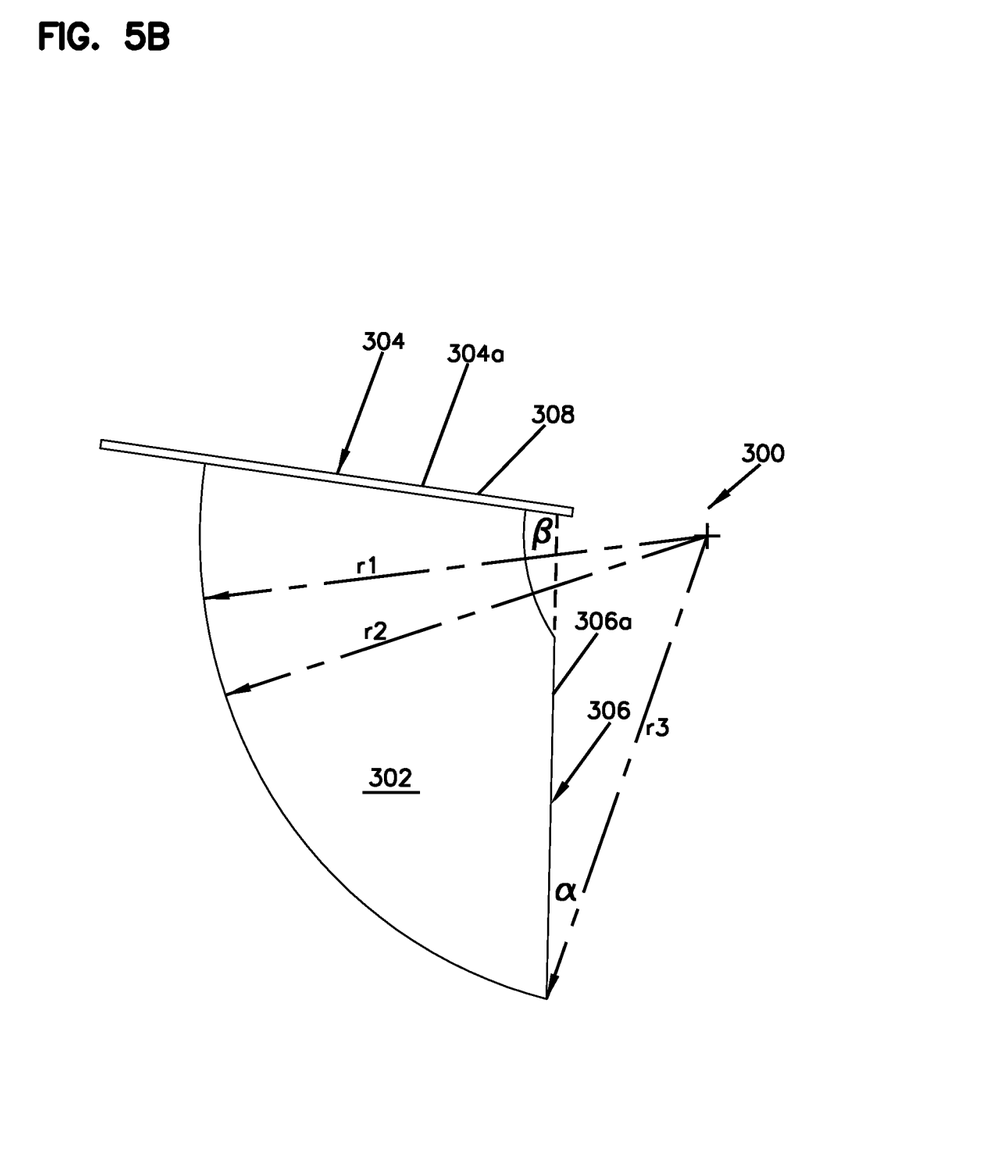

FIGS. 5A and 5B depict an aspect of the present teachings including an airflow diverter 300. The diverter 300 includes a substantially tubular body 302 that defines a flow turning surfaces between a first portion 304 and a second portion 306. In this aspect, each of the first portion 304 and the second portion 306 define an inlet or an outlet plane, respectively. The inlet plane 304a and the outlet plane 306a are oriented at an angle γ to each other. The first portion 304 can have a substantially round cross-section and can be surrounded by a flange 308. The flange 308 can allow the diverter 300 to be secured to existing inlet housings that may benefit from the use of a diverter 300. This configuration can permit the diverter 300 to serve as a retrofit application with existing inlet housings. In other aspects of the present teachings, the diverter may be cast integral with the inlet housing, or otherwise formed during manufacture thereof.

The second portion 306 can have a substantially oval cross-section. It should be appreciated in light of the disclosure that the cross-sectional area of the tubular body 302 can be consistent along the entire radius of curvature of the diverter 300. That is, a cross sectional area taken at a first radius of curvature $r_1$ can be consistent with a cross sectional area taken at a second radius of curvature $r_2$. However, the second portion 306 can be configured such that the outlet plane 306a is at an angle δ to a third radius of curvature $r_3$. This can create an oval cross section at the outlet plane 306a, as opposed to the round cross section at the inlet plane 304a. This can be shown to help further divert the redirected recirculation airflow into the desired orientation, relative to the internal configuration of the inlet housing. In this aspect of the present teachings, angle α can be selected such that the outlet opening 306 can be substantially orthogonal to the direction of aspiration airflow. Here, the angle β between the inlet plane 304a and the outlet plane 306a is an obtuse angle.

Figure 6:
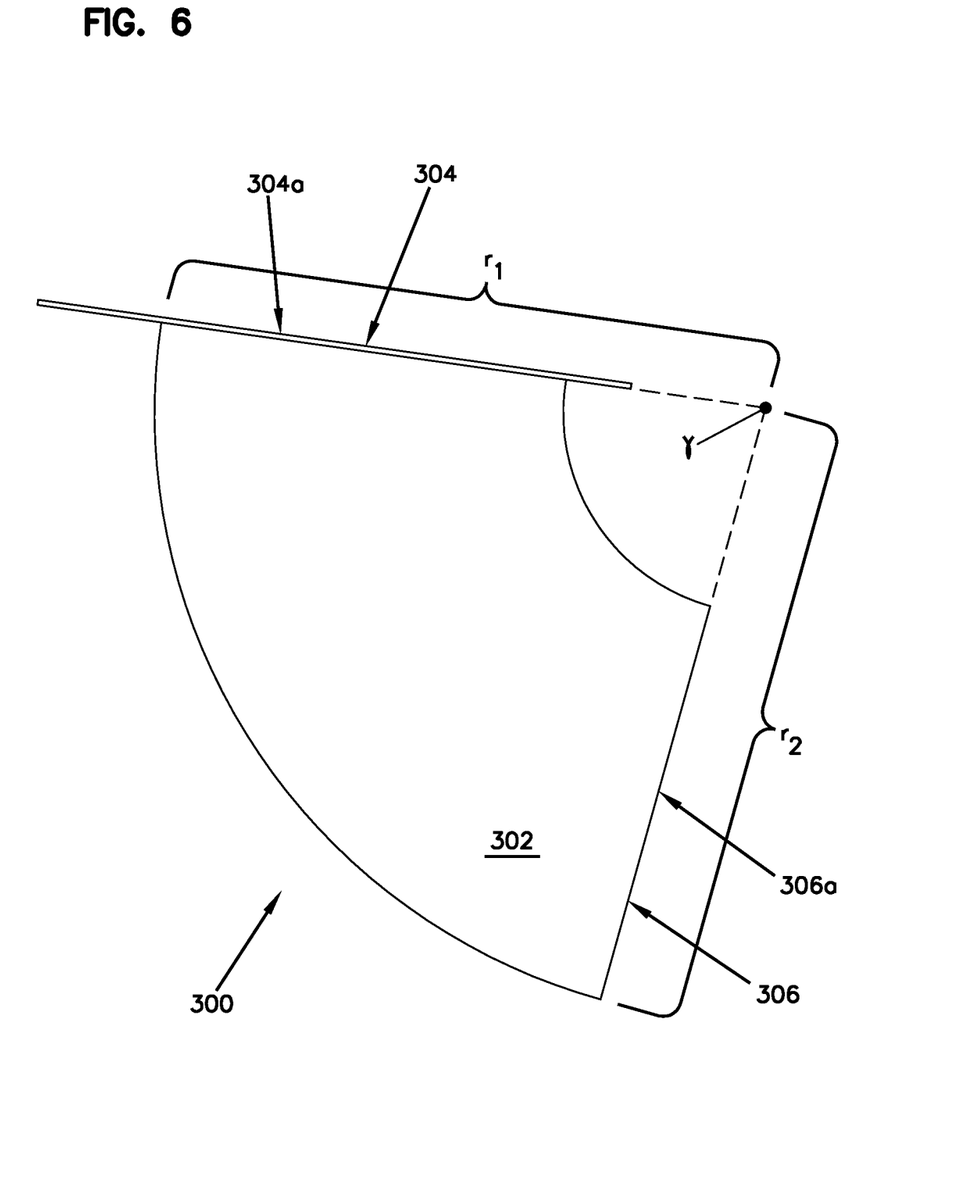
FIG. 6 depicts a side view of another bypass airflow diverter in accordance with the many aspects of the present teachings.

In the aspects of the present teachings depicted in FIG. 5B, $r_1$, $r_2$, and $r_3$ can be equal to each other. Diverters having other shapes or varied radii of curvature are also contemplated. FIG. 6 depicts one such configuration. There, a diverter 300 includes a tubular body 302. A second portion 306 defines an outlet plane 306a. The radius of curvature is consistent across the entire body 302. A radius $r_1$ is contained within the inlet plane 304a and a radius $r_2$ is contained within the outlet plane 306a. Accordingly, in FIG. 6, the diverter 300 has a first portion 304 and a second portion 306 that are similarly shaped, in this case, round. Here, the angle γ may be about 90° or may be an acute angle, again as required or desired for a particular configuration of the inlet housing into which the diverter 300 is inserted.

Figure 7:
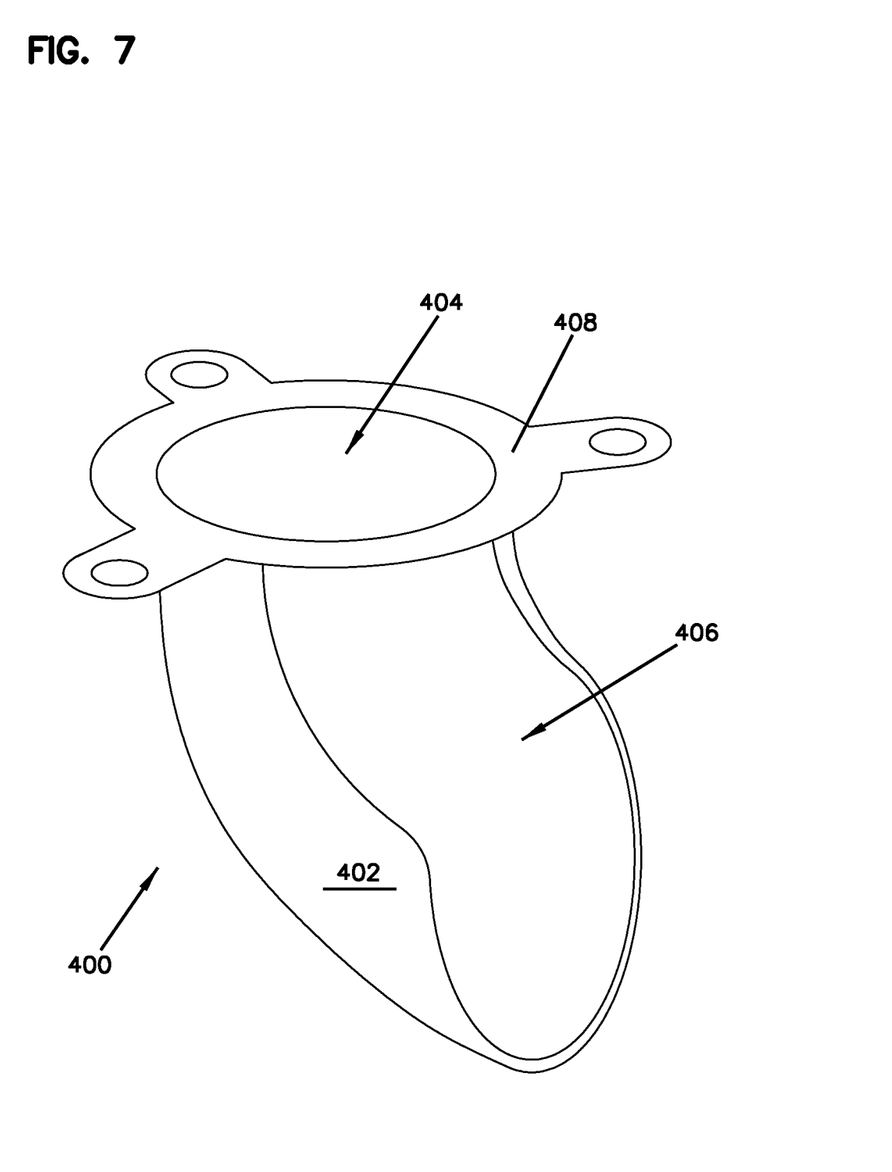
FIG. 7 depicts a perspective view of another bypass airflow diverter in accordance with the many aspects of the present teachings.

In another configuration, depicted in FIG. 7, the diverter 400 includes an open body 402. Here, a flange 408 defines a round inlet opening 404. The body, however, defines a substantially U-shaped channel 406. In other embodiments, the open channel 406 may be V-shaped. The curvature of the base of the channel 406 still provides for redirection of the redirected recirculation airflow.

While there have been described herein what are to be considered exemplary and preferred aspects of the present teachings, other modifications of the disclosure will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the present teachings. Accordingly, what is desired to be secured by Letters Patent is the technology as defined and differentiated in the following claims, and all equivalents.

What is claimed is:

1. A supercharger system comprising:
    a supercharger main housing enclosing one or more active components for moving air from an upstream side to a downstream side of the supercharger main housing;
    a supercharger inlet housing mounted at the upstream side of the supercharger main housing;
    a re-circulation line that provides fluid communication between the downstream side of the supercharger main housing and the supercharger inlet housing; and
    the supercharger system including multiple operating positions including an open operating position and a closed operating position; wherein in the open operating position recirculation air is allowed to flow through the re-circulation line from the downstream side of the supercharger main housing to the supercharger inlet housing, and in the closed operating position recirculation air is prevented from flowing through the re-circulation line; and
    a flow diverter being positioned within the supercharger inlet housing, the flow diverter remaining stationary throughout action of the multiple operating positions of the supercharger system such that the flow diverter has a constant configuration, location, and direction between conditions of the open and closed operating positions, the flow diverter having first and second portions within the supercharger inlet housing, the first portion defining a first re-circulation flow direction and the second portion defining a second re-circulation flow direction, the second re-circulation flow direction being angled relative to the first recirculation flow direction, the second portion being located at an outlet end of the re-circulation line, the second re-circulation flow direction maintaining a fixed orientation relative to a main flow direction through the supercharger inlet housing at the location of the outlet end of the re-circulation line as the supercharger system is moved between the open and closed operating positions, wherein the flow diverter includes a flow turning surface that provides a curved transition between the first and second portions such that recirculation air immediately exiting the second portion of the flow diverter has the same flow orientation as naturally aspirated air entering the supercharger.

2. The supercharger system of claim 1, wherein the first re-circulation flow direction is orthogonal with respect to a side wall of the supercharger inlet housing through which the first portion of the flow diverter extends, and wherein the second re-circulation flow direction is parallel to the main flow direction through the supercharger inlet housing at the location of the outlet end of the re-circulation line.

3. The supercharger system of claim 1, wherein the second re-circulation flow direction is angled 45-135 degrees relative to the first re-circulation flow direction.

4. The supercharger system of claim 1, wherein the second re-circulation flow direction is angled 60-120 degrees relative to the first re-circulation flow direction.

5. The supercharger system of claim 1, wherein the second re-circulation flow direction is angled 75-105 degrees relative to the first re-circulation flow direction.

6. The supercharger system of claim 1, wherein the second re-circulation flow direction is angled 90 degrees relative to the first re-circulation flow direction.

7. The supercharger system of claim 1, wherein the second re-circulation flow direction extends toward the upstream side of the supercharger main housing and is angled no more than 45 degrees relative to the main flow direction through the supercharger inlet housing at the location of the outlet end of the re-circulation line.

8. The supercharger system of claim 1, wherein the second re-circulation flow direction extends toward the upstream side of the supercharger main housing and is angled no more than 30 degrees relative to the main flow direction through the supercharger inlet housing at the location of the outlet end of the re-circulation line.

9. The supercharger system of claim 1, wherein the second re-circulation flow direction extends toward the upstream side of the supercharger main housing and is angled no more than 15 degrees relative to the main flow direction through the supercharger inlet housing at the location of the outlet end of the re-circulation line.

10. The supercharger system of claim 1, wherein the second re-circulation flow direction extends toward the upstream side of the supercharger main housing and is angled 90 degrees relative to the main flow direction through the supercharger inlet housing at the location of the outlet end of the re-circulation line.

11. The supercharger system of claim 1, wherein the outlet end of the re-circulation line faces in a downstream direction and wherein the second re-circulation flow direction is angled no more than 45 degrees relative to the main flow direction of naturally aspirated air through the supercharger inlet housing at the location of the outlet end of the re-circulation line.

12. The supercharger system of claim 1, wherein the first portion and the second portion define an inlet plane or an outlet plane respectively, the first portion having a round cross-section that is surrounded by a flange, and the second portion having an oval cross-section.

13. The supercharger system of claim 1, further comprising a valve for opening and closing the re-circulation line.

14. The supercharger system of claim 13, wherein the downstream side of the supercharger main housing is in fluid communication with an intake of an engine, and wherein the supercharger system further includes a controller for opening the valve when the engine operates under low load conditions, and for closing the valve when the engine operates under high load conditions.

15. The supercharger system of claim 1, wherein the flow diverter is formed by a tubular body including a flange surrounding the first portion of the flow diverter to secure the flow diverter within a part of the supercharger inlet housing.

16. The supercharger system of claim 15, wherein the tubular body of the flow diverter has an open-sided, scoop-shaped configuration with a transverse cross-section profile that is U-shaped.

17. A supercharger system comprising:
a supercharger having an inlet and an outlet;
a re-circulation line that provides fluid communication between outlet and the inlet, the re-circulation line including a flow diverter having first and second portions within the inlet, the first portion defining a first re-circulation flow direction and the second portion defining a second re-circulation flow direction, the second re-circulation flow direction being angled relative to the first re-circulation flow direction, and the second portion being located at an outlet end of the re-circulation line; and
a valve in the re-circulation line for opening and closing the re-circulation line, the flow diverter being positioned within the inlet of the supercharger and remaining stationary as the valve is opened and closed;
wherein the second re-circulation flow direction maintains a fixed orientation relative to a main flow direction through the supercharger inlet housing at the location of the outlet end of the re-circulation line as the valve is opened and closed, and
wherein the flow diverter includes a flow turning surface that provides a curved transition between the first and second portions such that recirculation air immediately exiting the second portion of the flow diverter has the same flow orientation as naturally aspirated air entering the supercharger.

18. The supercharger system of claim 17, wherein the second re-circulation flow direction is angled 45-135 degrees relative to the first re-circulation flow direction.

19. The supercharger system of claim 17, wherein the second re-circulation flow direction is angled 60-120 degrees relative to the first re-circulation flow direction.

20. The supercharger system of claim 17, wherein the second re-circulation flow direction is angled 75-105 degrees relative to the first re-circulation flow direction.

21. The supercharger system of claim 17, wherein the second re-circulation flow direction is angled 90 degrees relative to the first re-circulation flow direction.

22. The supercharger system of claim 17, wherein the outlet end of the re-circulation line faces in a downstream direction and wherein the second re-circulation flow direction is angled no more than 45 degrees relative to the main flow direction of naturally aspirated air through the supercharger inlet housing at the location of the outlet end of the re-circulation line.

23. The supercharger system of claim 17, wherein the supercharger system further includes a controller for opening the valve when an engine operates under low load conditions, and for closing the valve when the engine operates under high load conditions.

24. The supercharger system of claim 17, wherein the first portion and the second portion define an inlet plane or an outlet plane respectively, the first portion having a round cross-section that is surrounded by a flange, and the second portion having an oval cross-section.

25. The supercharger system of claim 17, wherein the flow diverter is formed by a tubular body including a flange surrounding the first portion of the flow diverter to secure the flow diverter within a part of the supercharger inlet housing.

26. The supercharger system of claim 25, wherein the tubular body of the flow diverter has an open-sided, scoop-shaped configuration with a transverse cross-section profile that is U-shaped.

27. A supercharger system comprising:
a supercharger having an inlet and an outlet;
a re-circulation line that provides fluid communication between the outlet and the inlet, the re-circulation line including a terminal end portion that extends within the inlet, the terminal end portion being configured to direct re-circulation flow into the inlet of the supercharger along a re-circulation direction that is angled no more than 45 degrees relative to a main flow direction through the inlet of the supercharger; and
a valve in the re-circulation line for opening and closing the re-circulation line, a flow diverter having first and second portions within the supercharger inlet housing and remaining stationary as the valve is moved between open and closed operating positions, the flow diverter defining the re-circulation direction, wherein the flow diverter includes a flow turning surface that provides a curved transition between the first and second portions such that recirculation air immediately exiting the second portion of the flow diverter has the same flow orientation as naturally aspirated air entering the supercharger.

28. The supercharger system of claim 27, wherein the re-circulation direction extends toward the upstream side of the supercharger main housing and is angled no more than 30 degrees relative to the main flow direction through the supercharger inlet housing at the location of the outlet end of the re-circulation line.

29. The supercharger system of claim 27, wherein the supercharger system further includes a controller for opening the valve when an engine operates under low load conditions, and for closing the valve when the engine operates under high load conditions.

30. The supercharger system of claim 27, wherein the first portion and the second portion define an inlet plane or an outlet plane respectively, the first portion having a round cross-section that is surrounded by a flange, and the second portion having an oval cross-section.

31. The supercharger system of claim 27, wherein the flow diverter is formed by a tubular body including a flange surrounding the first portion of the flow diverter to secure the flow diverter within a part of the supercharger inlet housing.

32. The supercharger system of claim 21, wherein the tubular body of the flow diverter has an open-sided, scoop-shaped configuration with a transverse cross-section profile that is U-shaped.

* * * * *